United States Patent [19]

Jantzi

[11] 4,362,458
[45] Dec. 7, 1982

[54] APPARATUS FOR MOVING LARGE HEAVY OBJECTS

[76] Inventor: Albert T. Jantzi, 5520 W. Mission La., Glendale, Ariz. 85302

[21] Appl. No.: 196,402

[22] Filed: Oct. 14, 1980

[51] Int. Cl.$^3$ ............................................. B60P 3/000
[52] U.S. Cl. ................................. 414/458; 254/2 R; 280/47.13 R; 280/47.2; 280/47.29; 414/490
[58] Field of Search ............ 280/47.2, 47.13 R, 47.16, 280/47.17, 47.18, 47.19, 47.21, 47.22, 47.23, 47.24, 47.25, 47.26, 47.27, 47.28, 47.29 X, 35, 638, 79.1 R; 414/444–458, 490 X, 607, DIG. 10, DIG. 911, 418; 254/2 R, 2 C; 180/11, 12, 13

[56] References Cited

U.S. PATENT DOCUMENTS

| | | | |
|---|---|---|---|
| 2,415,655 | 2/1947 | Reinert | 280/47.13 R X |
| 2,548,806 | 4/1951 | Montour | 280/47.24 X |
| 2,814,402 | 11/1957 | Schaeffer | 280/47.29 X |
| 3,138,265 | 6/1964 | Hansen | 414/444 X |
| 3,631,999 | 1/1972 | Walerowski | 254/2 R X |
| 3,638,815 | 2/1972 | Fincher | 414/458 |
| 3,672,634 | 6/1972 | Chaffin | 254/2 C |
| 3,941,399 | 3/1976 | Peters et al. | 280/47.29 |
| 3,944,094 | 3/1976 | Compton | 254/2 R X |

FOREIGN PATENT DOCUMENTS 82983  9/1895  Fed. Rep. of Germany ... 280/47.27

Primary Examiner—Joseph F. Peters, Jr.
Assistant Examiner—M. J. Hill

[57] ABSTRACT

Apparatus for moving large, heavy, unwieldy objects includes a pair of hand trucks, each of which has a frame with a lift plate slidably mounted in the frame. A jack is positioned on each frame to raise and lower the lift plate. Two pairs of wheels are mounted on the base of each frame with one pair of swivel wheels mounted on the underside of the base and a pair of fixed wheels of larger diameter than the swivel wheels being secured to the base. The perimeters of the fixed wheels are above those of the swivel wheels by a slight distance when the hand trucks are substantially vertical. Large, heavy objects such as refrigerators, vending machines, and the like, are positioned between the trucks and are supported on the lift plates by being positioned on the lift platforms with which each lift plate is provided or by being supported by attachment brackets to the lift plates. The weight of the object is transferred to the wheels of the trucks by operating the jacks to raise the lift plates. By raising one lift plate slightly more than the other, the fixed wheels of one hand truck contact the surface over which the object is to be moved and transmit the weight of the load to the surface while the swivel wheels of the other truck contact the surface.

9 Claims, 10 Drawing Figures

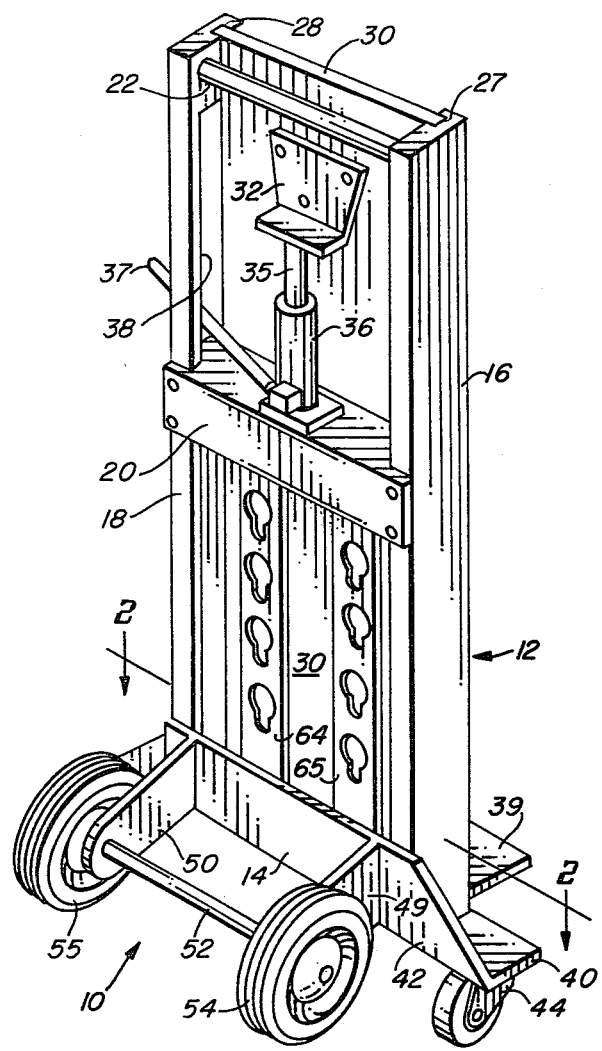
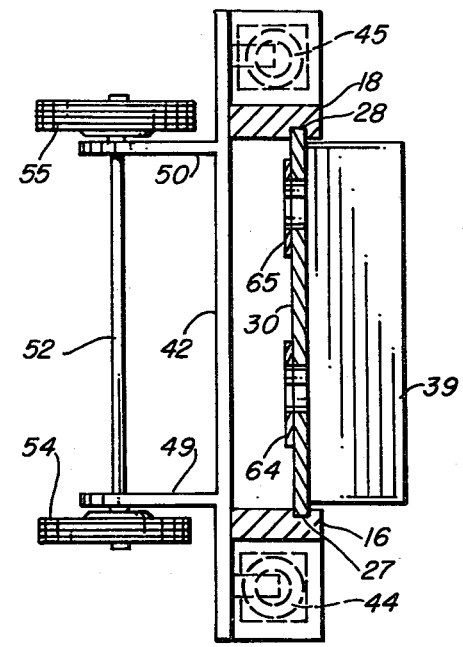
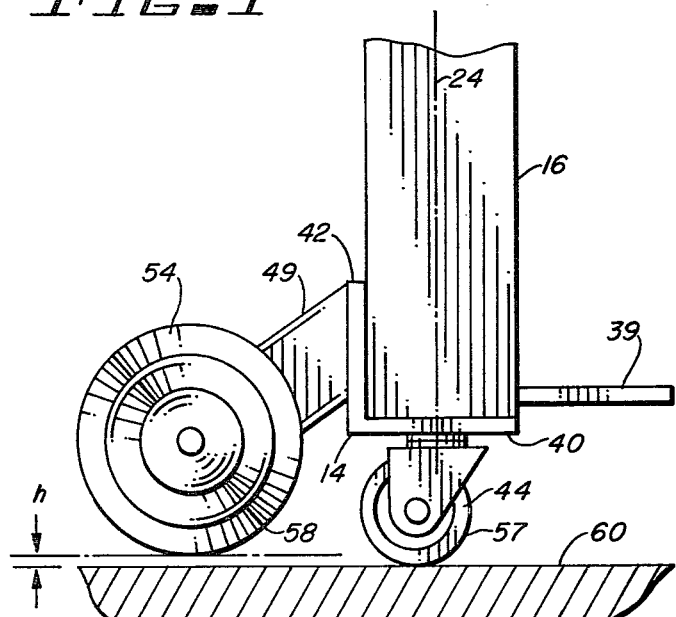
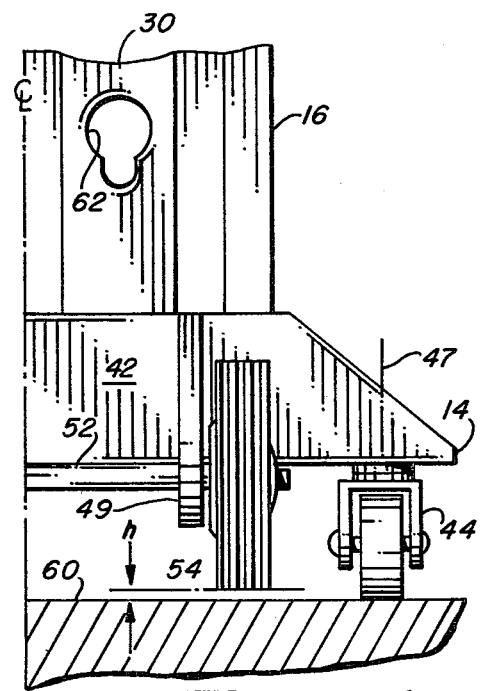
U.S. Patent  Dec. 7, 1982  Sheet 1 of 2  4,362,458
FIG. 1
FIG. 2
FIG. 3
FIG. 4

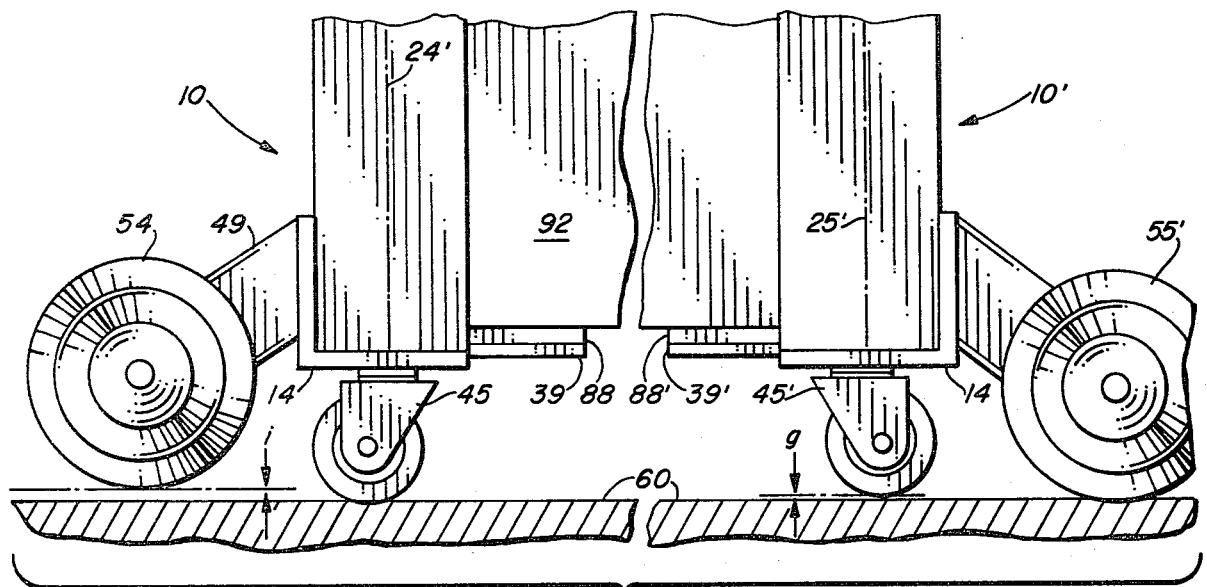
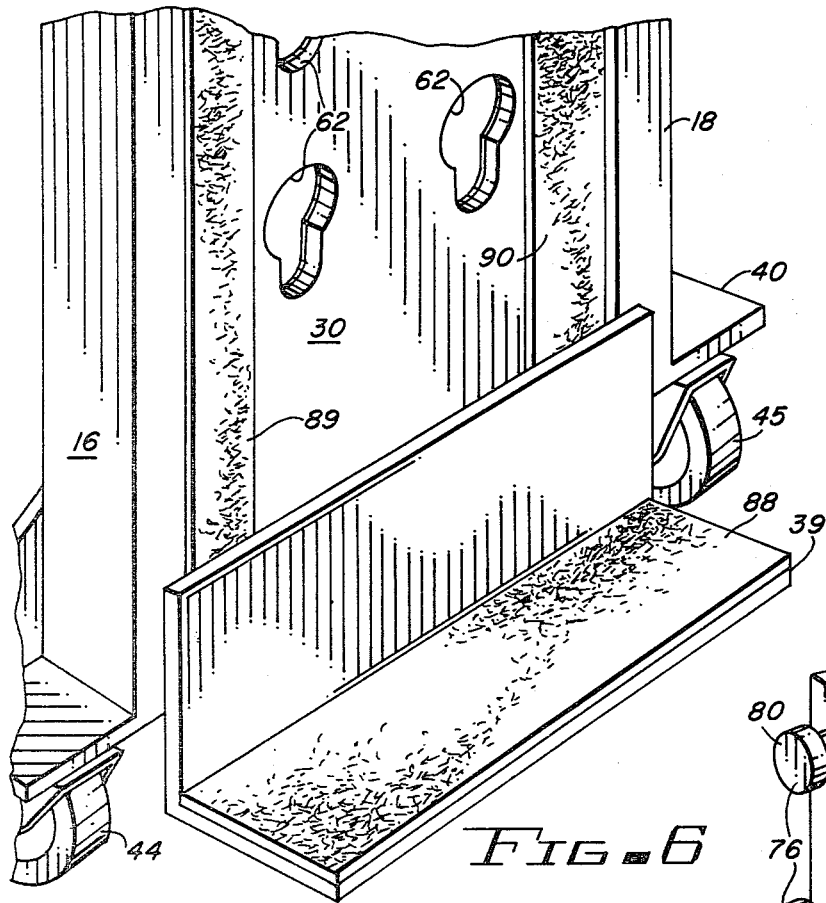
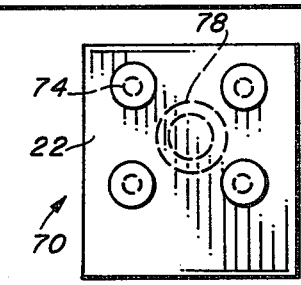
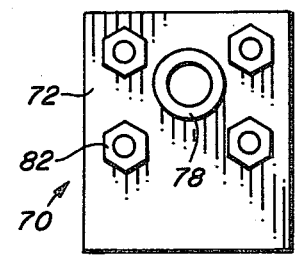
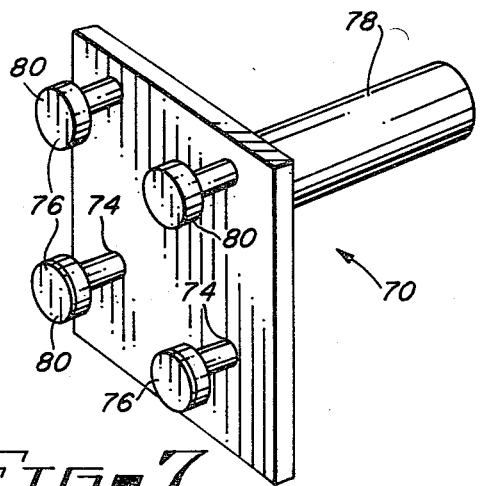
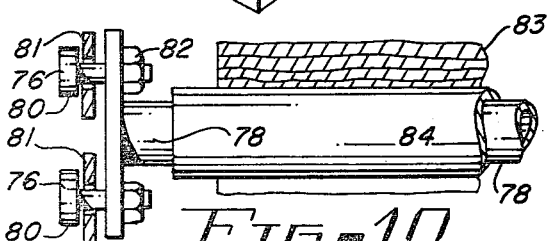

APPARATUS FOR MOVING LARGE HEAVY OBJECTS

BACKGROUND OF THE INVENTION

1. Field of the Invention

This invention is in the field of hand trucks for moving unwieldy and heavy objects in which the object to be moved is positioned between a pair of such hand trucks. Each hand truck is provided with one pair of fixed wheels and a pair of castered wheels. By adjusting the heights of the load relative to the hand trucks, the weight of the load is carried by the fixed wheels of one truck and the castered wheels of the other which facilitates one person maneuvering the loaded trucks.

2. Description of the Prior Art

In buildings, both domestic and commercial, there is frequently a need to move unwieldy objects, unwieldy for one or two men because of either size, or weight, or both of the object. Examples are refrigerators, stoves, vending machines, safes, rolled rugs, coils of wire, coils of cable and the like; particularly those that weigh substantially in a range of from 500 to 1000 pounds. Such objects are frequently moved without the use of powered equipment, by hand trucks, for example, and it is known to support objects of the foregoing types between a pair of hand trucks.

One problem with using a pair of prior art hand trucks to move such objects arises because the wheels of each hand truck are swivelled, or castered, with the result that to maneuver a large heavy and unwieldy load requires at least two persons, one at each truck to steer, or maneuver, the combination because of the tendency of such easily turned caster wheels to follow changes in contour, or resistance, of the surface over which the trucks are moving.

Another type of prior art hand truck has a single roller which extends substantially the full width of the hand truck. Such an arrangement makes turning the loaded hand trucks difficult, if not almost impossible, which is also the case if the hand trucks are provided with fixed wheels instead of castered wheels.

Other problems with prior art hand trucks, useful for carrying such unwieldy objects, is that their size and weight is such that it is difficult for one man to move them from one building or location to another in an automobile, or light utility vehicle, and their size is such that they occupy a substantial amount of space when not in use.

Yet another problem of the prior art hand trucks used to move unwieldy objects is that the prior art hand trucks are limited in the types of objects to be moved, being restricted primarily to objects having a lower surface that would fit on the planar upper surfaces of the lift platforms and which also had substantially vertical sides to engage the frame or lift plate of such trucks to prevent the lift trucks from being twisted out of the proper position for supporting the load.

PRIOR ART STATEMENT

The following references are submitted under the provisions of 37 C.F.R. 1.97(b) which references were found during a search conducted on behalf of applicant.

U.S. Pat. No. 2,415,655, Reinert;
U.S. Pat. No. 2,814,402, Schaefer;
U.S. Pat. No. 3,138,265, Hansen;
U.S. Pat. No. 3,941,399, Peters et al.

Reinert (U.S. Pat. No. 2,415,655) discloses a pair of hand trucks supporting a safe. The safe is supported on the lifting shelf 17 of left step 16 with which each truck is provided. Each lift step 16 is raised or lowered by lifting jack 18. Weight of the load is transferred to the traction rollers 13, the axles 14 of which are journaled in bearings 15 carried in the rails 10 of each frame A. Fixed wheels 29 are detachably secured to frames A.

Schaefer (U.S. Pat. No. 2,814,402) discloses a hand truck for handling block-type material. Schaefer's plate 42 is provided with a plurality of keyhole shaped openings 58 into which can be removably positioned tines 51 which support a package of block-type elements.

Hansen (U.S. Pat. No. 3,138,265) discloses a dolly for handling doors whose base frame 2 is provided with three castered wheels.

Peters et al (U.S. Pat. No. 3,941,399) discloses a hand truck for barrels, drums, and the like, which is provided with a pair of fixed wheels and a pair of auxiliary castered, or swivelled wheels, which are mounted on an auxiliary support 30, which support is pivotally attached to the frame of the hand truck.

SUMMARY OF THE INVENTION

The present invention provides apparatus for maneuvering large, heavy, unwieldy objects over a surface. A pair of hand trucks are used to support the object. Each truck is provided with a frame with a lift platform slidably mounted on the frame. A jack is mounted on the frame and engages the lift plate to raise and lower the lift plate relative to the frame. Two pairs of wheels are mounted on each frame, one pair being a pair of castered wheels and the other pair being fixed. The fixed wheels are positioned relative to the castered wheels so that the circumference of the fixed wheels is spaced above a horizontal surface on which the hand truck is standing substantially vertically. Loads that can be supported by the lift platform of each lift plate, including palleted objects, are raised by operation of the jacks with which each truck is provided. Raising the lift plate of one truck slightly higher than the lift plate of the other, tilts the load slightly and the hand trucks as well so that the fixed wheels of one truck will engage the surface over which the object is to be moved while the castered wheels of the other truck engage this surface. As a result, it is possible for one person to maneuver the load from the truck whose castered wheels are in contact with the surface.

The hand trucks are provided with a pair of adaptors, which can be removably secured to the lift plates. The adaptors are constructed so that a length of pipe, for example, can be removably supported by the adaptors with the result that a hollow cylindrical load such as rugs, coiled cables and the like, can be lifted and moved by the two hand trucks.

The hand trucks are sufficiently light so that one person can place them in the trunk of a car, for example. The lift plates can be slid out of the frame for storage and to reduce the weight of the frame while moving it from one location to another.

It is therefore an object of this invention to provide improved apparatus for moving large, heavy, unwieldy objects over a surface in which the apparatus is manueverable by one person.

It is another object of this invention to provide a pair of hand trucks which can be used to support large and heavy objects between the two trucks and which combination can be maneuvered by one person.

It is still another object of this invention to provide an improved hand truck which can be placed in the trunk of a car by one person, which can be used as a conventional hand truck, and which, in conjunction with the second hand truck, can be used by one person to more heavy, awkward loads.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view of a preferred embodiment of a hand truck of this invention;

FIG. 2 is a sectional view taken on line 2—2 of FIG. 1;

FIG. 3 is a side elevation of the hand truck of this invention with parts broken away;

FIG. 4 is a rear elevation of the hand truck of this invention with parts broken away;

FIG. 5 is a side elevation with parts broken away of a pair of hand trucks of this invention carrying an object;

FIG. 6 is a perspective view with parts broken away of a hand truck of this invention;

FIG. 7 is a perspective at a reduced scale of an adaptor for a hand truck of this invention;

FIG. 8 is a rear elevation of the adaptor, or bracket, of FIG. 7;

FIG. 9 is a front elevation of the bracket of FIG. 7; and

FIG. 10 is a side elevation of the bracket of FIG. 7 with a pipe supported by the bracket and a hollow cylindrical load supported by the pipe, the pipe and load being broken away.

DETAILED DESCRIPTION OF THE INVENTION

In FIG. 1, hand truck, or dolly, 10 has a frame 12. Frame 12 has a base 14, a pair of side rails 16, 18, an intermediate cross member 20 and a top cross member 22 which can also serve as a handle. The frame 12, which is substantially rectangular in shape, has its base 14 secured to the bottom, or lower, ends of rails 16, 18 by any suitable means including bolting them together. Top cross member 22 interconnects the upper ends of rails 16, 18 while intermediate cross member 20 interconnects rails 16, 18 intermediate, or approximately in the middle, of the ends thereof. Rails 16, 18 are mounted on base 14 so that they are substantially parallel, and each has a longitudinal axis 24, 25. Grooves 27, 28 are formed in each side rails 16, 18 and extend the length thereof being substantially parallel to the longitudinal axes 24, 25 of rails 16, 18. Lift plate 30 is slidably positioned in grooves 27, 28 of rails 16, 18. Frame 12 is so designed that lift plate 30 can be easily removed from and reinserted into frame 12.

A lift bracket 32 is mounted on the rear side of lift plate 30, as is best illustrated in FIG. 1. Bracket 32 contacts, or rests, on the upper end of movable piston rod 35 of a conventional hydraulic jack 36. Jack 36 is removably mounted, or secured, on the upper surface of cross member 20, and jack control lever 37 extends through opening 38 of side rail 18 so that jack 36 can be operated to raise or lower lift plate 30. Lift platform 39 is secured, or mounted, on the lower front portion of lift plate 30 on the side opposite to that on which bracket 32 is mounted.

Base 14 has a base plate 40 and a riser 42. A pair of castered wheels 44, 45 are mounted on the underside of base plate 40 outboard of the rails 16, 18 as best seen in FIG. 4. Each castered wheel 44, 45 rotates about its respective swivel axis, wheel 44 about swivel axis 47 as illustrated in FIG. 4 with axis 47 being substantially parallel to the longitudinal axis 24 of rail 16. Castered wheel 45 is similarly positioned with respect to rail 18. Castered wheels 44, 45 are mounted so that irrespective of their angular position about their respective swivel axes, no physical conflict will exist between lift plate 30 and its lift platform 39 and castered wheels 44, 45.

A pair of axle brackets 49, 50 are secured to the rear side of riser 42 of base 14. Axle brackets 49, 50 position axle 52 on which are rotatably mounted fixed wheels 54, 55. Wheels 54, 55 are fixed in the sense that axle 52 is fixed relative to frame 12. As is best seen in FIGS. 3 and 4, fixed wheels 54, 55 are mounted on base 14 so that when truck 10 is positioned substantially vertically, the perimeter 57 of castered wheels 47 contacts substantially horizontal surface 60 while the perimeter 58 of wheel 54 is positioned a slight distance, approximately one-quarter of an inch in the preferred embodiment, above surface 60. This arrangement is equally true of castered wheel 45 and fixed wheel 55.

Lift plate 30 is provided with a plurality of keyhole slots 62. In the preferred embodiment, such slots are arranged in a rectangular array having two vertical columns and four horizontal rows. In the preferred embodiment, lift plate 30 is made of plywood. To protect the surface of lift plate 30, particularly in the vicinity of slots 62, from excessive wear, the areas of the rear surface of plate 30 around keyhole slots 62 are protected by metal layers 64, 65 which are secured to the rear surfaces of lift plate 30 by any conventional means.

In FIG. 7, load adaptor, or fixture, 70 has an adaptor plate 72 which is provided with four openings 74 through which bolts 76 can extend for removably mounting load adaptor 70 on lift plate 30 of truck 10, for example. A hollow cylindrical support 78 is fixedly secured to one side, the front side, of plate 72 by welding, for example. The heads 80 of bolts 76, together with washers 81, are adapted to be inserted through the larger diameter portions of four of the eight keyhole openings 62 of lift plate 30 with washers 81 between the heads 80 and the metal layers 64, 65 surrounding each of the keyhole slots 62. Adaptor 70 may be more rigidly secured to lift plate 30 by tightening nuts 82 on the threaded shanks of bolt 62 by means of a conventional wrench, for example. Which of the four keyhole slots 62 are used to secure adaptor 70 to lift plate 30 depends on the height, or size, of the hollow cylindrical load 83 to be carried by load support means 84, in the preferred example, a length of steel pipe. One end section of pipe 84 is positioned around cylindrical mount 78 of adaptor 70 which is mounted on hand truck 10 and the other end section of pipe 84 would be positioned around cylindrical mount 78' of adaptor 70' of lift truck 10'. Both adaptor 70' and hand truck 10' are substantially identical to adaptor 70 and hand truck 10 as described above.

As seen in FIG. 6, the top surface of lift platform 39 can be covered with a coarse, protective, felt padding 88 and the two outer edges of lift plate 30 can also be covered with two strips 89, 90 of such padding to reduce the risk of damaging the surfaces of objects to be moved as well as to increase the frictional forces, particularly between the bottom of object 92 and the top of the lift platform 39 supporting such object as seen in FIG. 5.

A large, heavy, or unwieldy load or object 92 having bottom surfaces preferably substantially flat surfaces that can be supported by lift platform 39, 39' of trucks 10, 10' and side walls that engage to a sufficient extent the front surfaces of side rails 16, 18, 16', 18' can be moved using two hand trucks 10, 10'. Examples of objects 92 that can be moved by two hand trucks 10, 10' working together, or in tandem, are refrigerators, vending machines, safes and the like. To move such an object 92, the lift plates 30, 30' are lowered by operating jacks 36, 36' until lift platforms 39, 39' can be slid under the bottom surface of load 92. If sufficient clearance to do so is not available, the lift platforms 39, 39' are lowered till they touch surface 60, the floor of a building, for example, and object 92 is tilted to permit platform 39' of truck 10' to be inserted under one side and a similar maneuver is conducted to insert platform 39 of truck 10 under the opposite side of load 92. By suitably operating jacks 36, 36', load 92 can be lifted until its weight is transferred to the lift plates 30, 30' and through castered wheels 44, 45, 44', 45' or fixed wheels 54, 55, 54', 55' to surface 60. By raising one side of load 92 slightly higher than the other; i.e., by raising platform 39 so that it is higher above surface 60 than platform 39', load 92 and trucks 10, 10' are tilted which will cause the fixed wheels 54', 55' of truck 10' to contact surface 60 while raising castered wheels 44', 45' above surface 60 distance g. Tilting of load 92 also tilts truck 10 which further raises the fixed wheels 54, 55 above surface 60 distance i. Frictional forces between load 92 and the upper surfaces of platform 39, 39' as well as contact between rails of trucks 10, 10' and the sides of load 92 prevent movement of trucks 10, 10' relative to load 92. With fixed wheels 54', 55' of truck 10' contacting surface 60 over which load 92 is to be moved, as well as castered wheels 44, 45 of truck 10, one person can maneuver load 92 from truck 10 since the fixed wheels 54', 55' of truck 10' will tend to follow a course perpendicular to axle 52' while the person pushing or pulling the load 92 from truck 10 can control its direction by the proper angling, or maneuvering, of truck 10.

When an unwieldy hollow cylindrical object 83, such as a rolled rug, coils of wire, cable or rope and the like, are to be moved, adaptors 70, 70' are removably secured to the lift plates 30, 30' of hand trucks 10, 10' by inserting the heads 80 of four bolts 76 plus washers 81 through four of the keyhole openings 62. Tightening nuts 82 increases the rigidity of the connection between adaptors 70, 70' and lift plates 30, 30'. Load support means, or pipe, 84 is placed through the center of load 86 so that it will extend beyond the ends of load 83. One end of pipe 84 will be inserted into or, preferably around, hollow cylindrical mount 78, and the other into or around mount 78' of adaptor 70' which is similarly fastened and mounted on lift plate 30' of hand truck 10'. The diameter of support pipe 84 and length of cylindrical mount 78 are chosen so that adaptors 70, 70' and pipe 84 provide a substantially rigid connection between the lift plate 30 of truck 10 and lift plate 30' of truck 10'. By operating jacks 36, 36', load 83 is lifted, and by raising lift plate 30 so that it is higher than lift plate 30', adaptor 70 is higher above surface 60 than adaptor 70' which tilts load 83 and trucks 10, 10' so that the fixed wheels 54, 55' of truck 10' apply the weight of the load 83 supported by truck 10' to surface 60 while the castered wheels 44, 45 of truck 10 apply the weight of load 83 supported by truck 10 to surface 60. As a result, one man can maneuver trucks 10, 10' with load 83 suspended between them by means of load adaptors, or brackets, 70, 70' in the same manner as load 92 is supported by lift platforms 39, 39' of trucks 10, 10' as described above. The maximum length of a hollow cylindrical load 83 that can be supported on load support means 84 between two hand trucks 10, 10' with the fixed wheels of one truck contacting surface 60 over which load 83 is to be moved and with the castered wheel of the other contacting surface 60, depends on, or is a function of, the amount of lift of jacks 36, 36' and the rigidity of the support systems which includes hand trucks 10, 10', adaptors 70, 70' and load support means 84.

In the preferred embodiment, the fixed wheels 54, 55 are eight inches in diameter and the castered wheels 44, 45 are three and one-half inches in diameter. Side rails 16, 18 are thirty-six inches long by five inches wide and can be made of wood or aluminum. Base 14 is made of three and one-half by four inch aluminum angle. Lift plate 30 is made from one inch thick plywood and cross member 20 and cross member 22 can be made of either wood or aluminum. Adaptors 70 are preferrably made of steel with cylindrical mount 78 being a twelve inch long piece of steel pipe having an external diameter of substantially two inches. Support pipe 84 has an internal diameter of two inches with enough clearance so that pipe 84 can easily fit over cylindrical mount 78 and its length is determined by the length of the load 83 to be carried by pipe 84.

From the foregoing, it is believed obvious that this invention provides apparatus for moving large, heavy and unwieldy objects by supporting such objects between two hand trucks. Tilting the load slightly by raising one end of the load above the other, causes the fixed wheels of one truck to transmit the load carried by that truck to the surface over which the load is to be moved and causes the castered wheels of the other truck to transmit the load carried by the second truck to the surface. As a result of the fixed wheels at one end of the load and the castered wheels at the other end carrying the load, one person can easily maneuver the load and its supporting trucks. In addition, the hand trucks of this invention can be used alone as a conventional hand truck.

It should be evident that various modifications can be made to the described embodiments without departing from the scope of the present invention.

What is claimed is:

1. Apparatus for moving a large, heavy, unwieldy object over a surface comprising: a pair of hand trucks, each of said trucks having a frame; a lift plate having a lift platform slidably mounted in said frame; force amplifying means for raising and lowering the lift plate relative to said frame; a pair of fixed wheels and a pair of castered wheels mounted on the frame of each truck; the lowest points on the perimeters of one of said pair of wheels being a slight distance above the corresponding points of the perimeters of the other pair of wheels when each truck is substantially vertical on said surface; said object adapted to be positioned so that it is supported by the lift plates of each truck, said wheels of each truck being positioned so that by raising one lift plate more than the other above the surface, the fixed wheels of one truck will contact said surface and the castered wheels of the other will contact said surface whereby the loaded trucks can be maneuvered over the surface by one person.

2. Apparatus as defined in claim 1 in which the lift plate of each truck is provided with means for mounting a load adaptor, and a pair of load adaptors removably secured to the lift plates of the hand trucks, load support means removably mounted on the adaptors, whereby a hollow cylindrical load can be moved by the apparatus by being supported by said load support means.

3. Apparatus as defined in claim 2 in which the means for mounting a load adaptor on the lift plate of each hand truck includes an array of keyhole slots.

4. Apparatus as defined in claim 1 in which each lift plate is provided with a lift platform on which the object to be moved is supported.

5. A hand truck comprising:
 a frame, said frame having a base having a base plate and a riser; a pair of said rails having longitudinal axes; an intermediate cross member; and a top cross member; a longitudinal groove formed in each rail substantially parallel to the longitudinal axes of said rails;
 a lift plate slidably mounted in said grooves, said lift plate having a lift platform and a lift bracket;
 means mounted between the intermediate cross member and the lift bracket for raising and lowering the lift plate relative to the frame;
 a pair of castered wheels of substantially the same perimeter mounted on the base plate so that the swivel axis of the castered wheels is substantially parallel to the longitudinal axis of the rails;
 a pair of fixed axle brackets secured to the riser;
 a fixed axle mounted between the axle brackets;
 a pair of wheels having substantially the same perimeters rotatably mounted on the fixed axle, the perimeters of the fixed wheels being substantially greater than the perimeters of the castered wheels;
 said castered wheels and fixed wheels being positioned so that when the hand truck is substantially vertical on a horizontal surface, the point on the perimeter of the fixed wheels closest to the horizontal surface is a slight distance above the horizontal surface.

6. A hand truck as defined in claim 5 in which the means for raising and lowering the lift plate relative to the frame is a hydraulic jack.

7. A hand truck as defined in claim 6 in which said slight distance is substantially 0.25 inches.

8. A hand truck as defined in claim 7 in which a load adaptor adapted to carry a hollow cylindrical load is mounted on the lift plate.

9. Apparatus for moving a hollow cylindrical load over a surface comprising: a pair of hand trucks, each of said trucks having a frame; a lift plate slidably mounted in each frame; means for raising and lowering the lift plate relative to the frame; a pair of fixed wheels and a pair of castered wheels mounted on each frame with the castered wheels mounted under the frame, the perimeters of the fixed wheels being substantially one-quarter of an inch above the surface when the truck is vertical and the castered wheels are in contact with said surface, load adaptor means mounted on each lift plate; and load support means for lifting said load, said load support means adapted to extend through the center of said hollow cylindrical load and to be removably mounted on the load adaptors.

* * * * *